United States Patent [19]

Riggs et al.

[11] 4,311,933
[45] Jan. 19, 1982

[54] BRUSHLESS DIRECT CURRENT MOTOR

[75] Inventors: William D. Riggs, Southington; Joseph J. Schegan, Wallingford, both of Conn.

[73] Assignee: North American Philips Corporation, New York, N.Y.

[21] Appl. No.: 70,069

[22] Filed: Aug. 27, 1979

[51] Int. Cl.³ .......................................... H02K 21/12
[52] U.S. Cl. ........................................ 310/156; 310/46; 310/67 R; 310/68 R; 310/224; 310/DIG. 3; 318/138
[58] Field of Search ................. 310/46, 67, 224, 136, 310/156, 68 R, 137, 138, DIG. 3, 68 B, DIG. 6, 139, 261, 223, 68 E; 318/138, 254; 324/146

[56] References Cited

U.S. PATENT DOCUMENTS

| | | | |
|---|---|---|---|
| 3,631,272 | 12/1971 | Kirii | 310/46 |
| 4,011,475 | 3/1977 | Schmider | 310/156 |
| 4,115,715 | 9/1978 | Muller | 310/67 R |
| 4,167,671 | 9/1979 | Sorensen | 318/138 |
| 4,169,990 | 10/1979 | Lerdman | 318/138 |
| 4,197,489 | 4/1980 | Dunn | 310/67 R |

*Primary Examiner*—R. Skudy
*Attorney, Agent, or Firm*—Robert S. Smith

[57] ABSTRACT

A brushless D.C. motor has electrical power switched between the phase windings by means of a circuit which includes a plurality of hall effect switches. The hall effect switches are operated by a plurality of arcuate commutating magnets which are radially polarized and are disposed axially adjacent to field magnets which are also radially polarized. Ordinarily, the direction of radial polarization of the commutating magnets and the field magnets will be opposite.

7 Claims, 8 Drawing Figures

BRUSHLESS DIRECT CURRENT MOTOR

BACKGROUND OF THE INVENTION

The prior art includes brushless D.C. motors which include switching circuits operated by electric filament lamps or light emitted diodes a photo-sensitive element and a slotted disc which is carried on the shaft which also carries the rotor. One such example is shown in Wessels, U.S. Pat. No. 3,299,335. Such structures provide power to a predetermined stator winding as the rotor passes through a predetermined angular sector. A disadvantage of such structures is that the phototransistor or other light sensitive element which is used with the light source is relatively expensive. Another disadvantage is that the disc with slots or a lobed cam which is used in such structures must be assemblied with great precision to insure the proper angular relationship between the rotor and the photosensitive element. In addition, the cost of the disc as well as the assembly time is also significant since such motors must be produced at a highly competitive price. Still another problem with such known motors is that the switching time between predetermined angular sectors of the rotor travel is less than is preferred. Yet another disadvantage of the prior art photosensitive element is the difficulty of shielding the photosensitive element from stray light.

It is an object of the invention to provide apparatus which will very rapidly switch electrical power to the windings of the stator as the rotor passes through predetermined angular sectors.

It is another object of the invention to provide apparatus which will in addition be insensitive to stray electrical fields and stray light.

Another object of the invention is to provide apparatus which will have greater simplicity than the prior art structures which utilize a light sensitive element and which may be assembled with less difficulty.

SUMMARY OF THE INVENTION

It has now been found that these and other objects of the invention may be attained in a multipole multiphase brushless direct current motor having a circuit for switching electrical power to the phase windings thereof which includes a plurality of hall effect switches. The apparatus in accordance with the invention may further include a plurality of angularly spaced field magnets and a plurality of angularly spaced commutating magnets carried on the rotor. Each of said commutating magnets may be disposed in axially adjacent relationship to one of the field magnets.

In one form of the invention, the field magnets and the commutating magnets are both radially polarized. In one form, the direction of radial polarization of the field magnets and the commutating magnets are opposite. The hall effect switches may be carried on the stator and in one form the stator will include a printed circuit board on which the hall effect switches are disposed. Ordinarily there will be one hall effect switch for each phase of the motor.

BRIEF DESCRIPTION OF THE DRAWING

The invention will be better understood by reference to the accompanying drawing in which.

DESCRIPTION OF A PREFERRED EMBODIMENT

Figure 1:
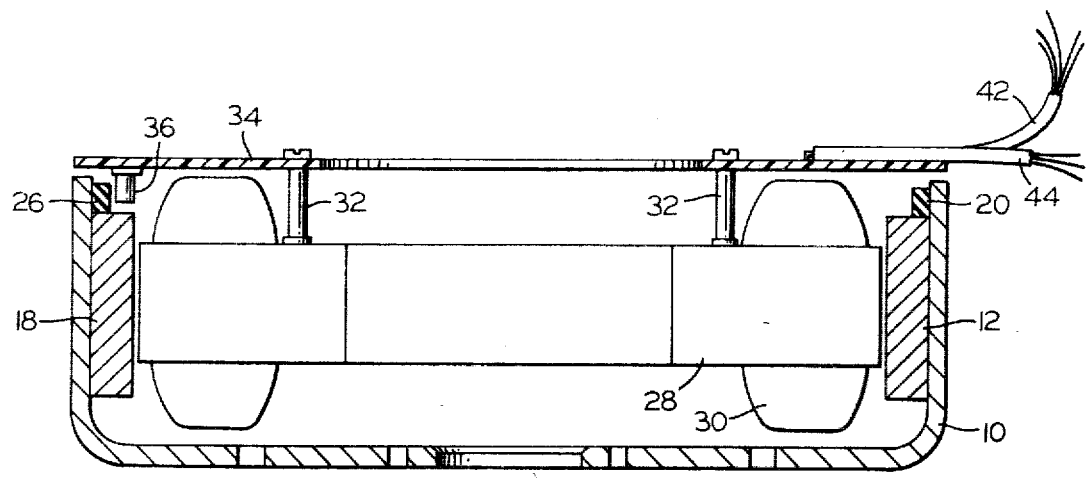
FIG. 1 is an elevational view in partial section of the apparatus in accordance with one form of the invention.
Figure 2:
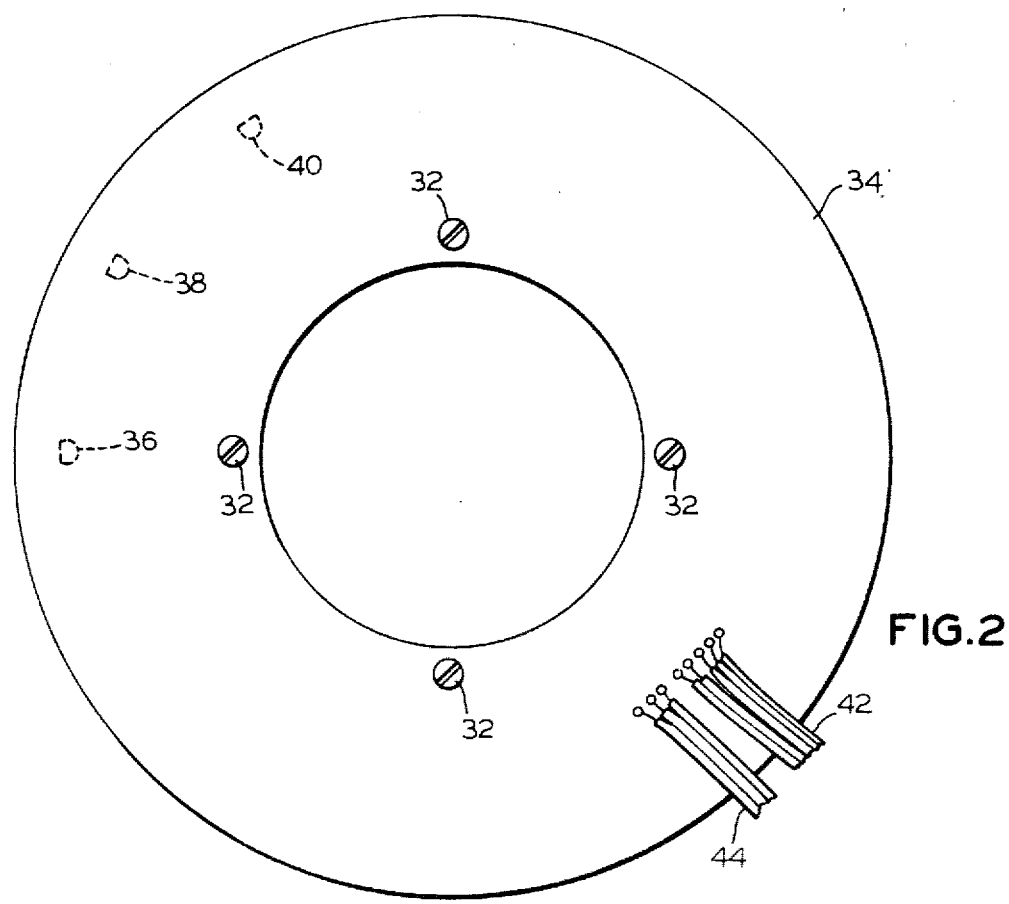
FIG. 2 is a plan view showing the printed circuit board illustrated in FIG. 1 in greater detail.
Figure 3:
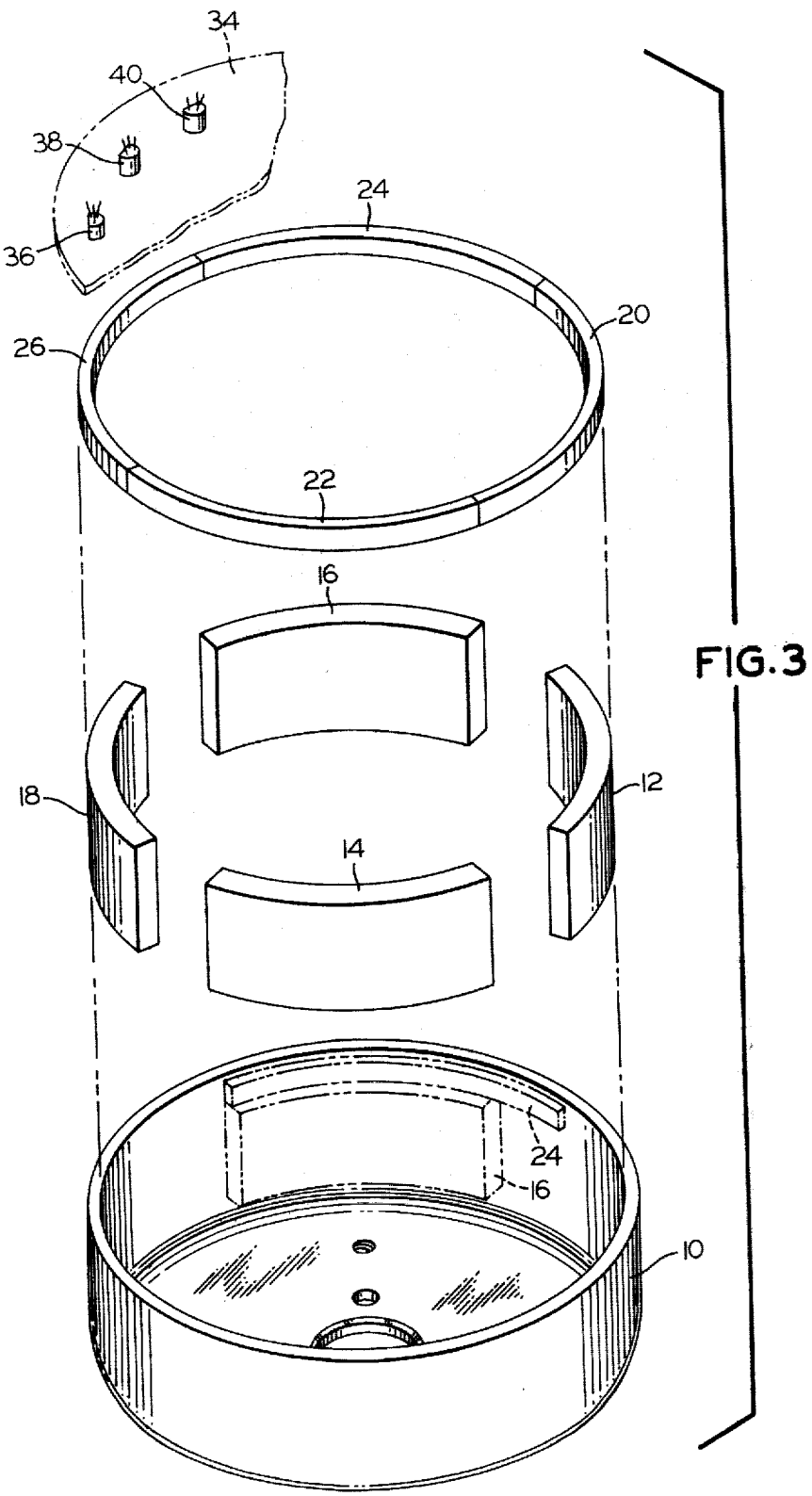
FIG. 3 is an exploded perspective view of the motor shown in FIG. 1.

Referring now to FIGS. 1, 2 and 3 there is shown a four pole three phase motor in accordance with one form of the invention. The motor has an "inside out" construction which includes a rotor assembly having a drum 10 which carries field magnets 12, 14, 16 and 18 disposed on the inside face of an annular flange. Each field magnet is preferably a sintered barium ferrite. Each of the field magnets 12, 14, 16 and 18 will have an angular extent in the four pole three phase motor in accordance with the invention of between 60° and 90°. Ordinarily the field magnet extent of 60° (mechanical) will be sufficient to provide the desired operating characteristics. Disposed axially adjacent to the field magnets 12, 14, 16 and 18 on the flange of the rotor drum 10 are commutating magnets 20, 22, 24 and 26. Each commutating magnet extends for a full 90 mechanical degrees and is disposed in end abutting relationship to another commutating magnets. The material of the commutating magnets may be a cured (vulcanized) nitrile rubber binder containing oriented barium ferrite magnetic material. Such magnets are sold under the trademark "Plastiform" which is a trademark of the 3M Corporation, St. Paul, Minn. It will be understood that other inferior grades (much less expensive grades) of magnets will be adequate. The location of the leading edge of the field magnets 12, 14, 16 and 18 is critical to the operating characteristics of the motor. More specifically, they must be precisely located at equal angular increments around the inside of the annular flange of the stator drum 10. The commutating magnets 20, 22, 24 and 26 are positioned precisely with their leading edge located exactly at the same angular location as the leading edge of the field magnets 12, 14, 16 and 18 as best shown at the bottom (as viewed) of FIG. 3.

The stator assembly includes a laminated stator assembly 28 and stator windings 30. Supports 32, 32, 32 carry a printed circuit board 34 in spaced relationship to the annular flange of the rotor drum 10. The board 34 is disposed in generally perpendicular relationship to the axis of rotation of the rotor. Located on the board 34 are three hall effect switches 36, 38 and 40.

Figure 4:
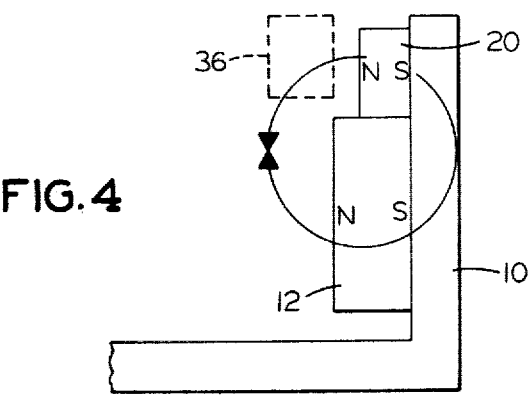
FIG. 4 is a schematic view illustrating one possible polar relationship between the field and commutating magnets.
Figure 5:
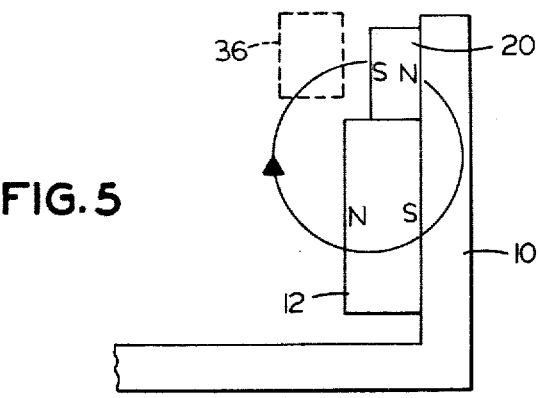
FIG. 5 is a schematic view illustrating another possible polar relationship between the field and commutating magnets.

Referring now to FIGS. 4 and 5 there are shown two schematic representations of two possible polar orientations of the field and commutating magnets. In each case, the commutating and field magnets which are respectively identified by the numerals 20 and 12 are radially polarized. In both figures, the field magnet 12 is not only radially polarized but radially polarized in the same direction. The commutating magnet however is radially polarized in different directions in FIGS. 4 and 5. The schematic representation of the circular flux path produced by the magnets 12 and 20 will be understood to indicate that in the embodiment of FIG. 4, flux produced by the field magnet 12 passes in a generally clockwise direction and opposes the generally counterclockwise direction of flux movement from the commutating magnet 20. In the embodiment of FIG. 5, the flux produced by commutating magnet 20 also moves in a clockwise movement and the cumulative effect increases the field strength in the region of the hall effect switch 36. In the embodiment of FIG. 5 the greater flux density produced by having the field magnet 12 and the commutating magnet 20 disposed with the opposite radial polar orientation results in several beneficial effects. More specifically, the hall effect switch 36 will respond more rapidly because the higher flux density inherently produces a faster response. Another beneficial effects is that the specifications for the hall effect switch may be less critical if the flux density is greater. Still another advantage is that the switching is less vulnerable to stray fields such as that produced by the adjacent stator winding if the field is enhanced by having the opposite polar orientation of the commutating and field magnets 20, 12.

Figure 7:
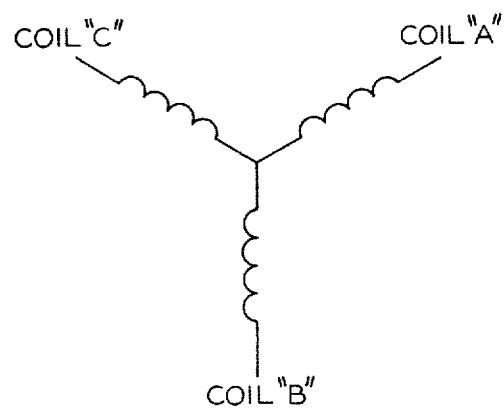
FIG. 7 is a schematic view illustrating the electrical connections between the three phases of the motor for which the data is given in FIG. 6.
Figure 6:
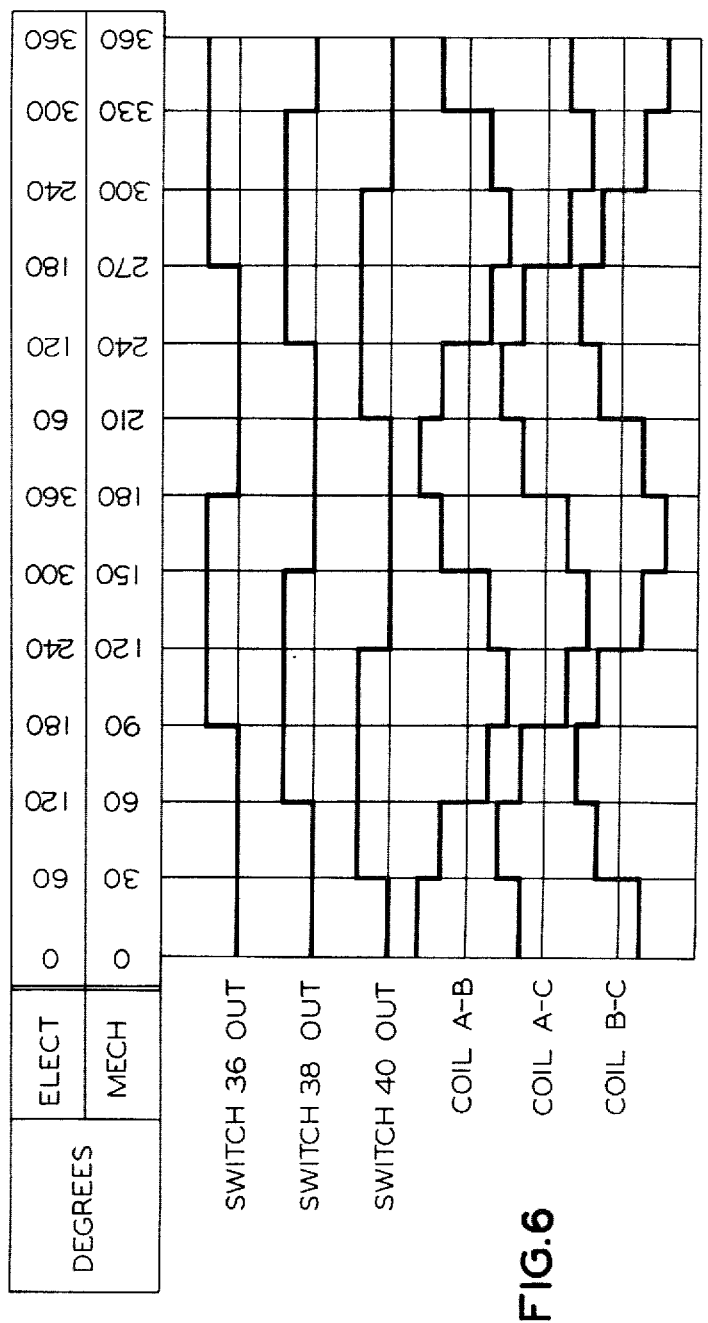
FIG. 6 is a chart illustrating the electrical and mechanical angular relationships between the output of the hall effect switches, and the generated wave forms measured between windings in a motor constructed in accordance with the invention.
Figure 8:
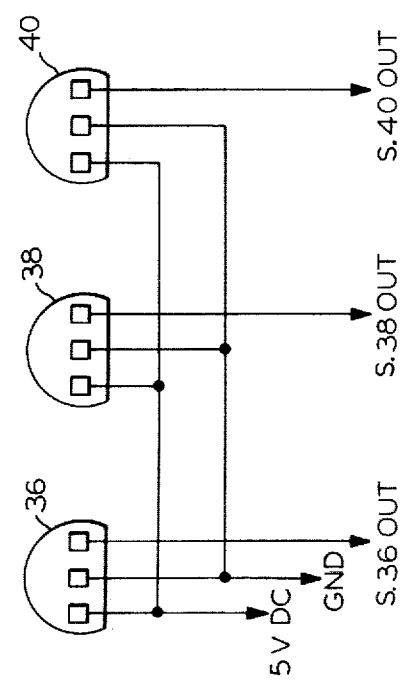
FIG. 8 is a partially schematic view showing the electrical connections to the three hall effect cells in the motor of FIG. 1.

Referring to FIG. 8 there are shown the three hall effect switches 36, 38 and 40 which each have three connections. Ground and five volt D.C. connections are provided to two terminals of each switch and a third terminal thereof produces an output signal which will be either zero or five volts D.C. depending upon the magnetic field which varies the switching characteristics of the hall effect switch. A printed circuit (omitted for simplicity in FIG. 2) connects the hall effect switches 36, 38 and 40 to cables 44, 42 which connect the output of the hall effect switches to a logic circuit (not shown). Referring to FIG. 6, there is shown a chart of the hall effect switch 36, 38 and 40 outputs for 360 mechanical degrees of rotor movement. Also shown is the electrical degree relationship and the generated voltage relationship between the free ends of one coil relative to another. Referring to FIG. 7 there is shown schematically the physical connections between the three coils in the four pole three phase motor of the preferred embodiment. The representation in FIG. 6 designated by the legend "coil A-B" is an indication of the generated wave form measured between the free ends of coil A-B produced in the motor in accordance with the invention when it is physically turned and thus acts as a generator. It will be understood by those skilled in the art that the wave form illustrated is the complement of the wave form which will be produced when the motor is operated as a motor instead of a generator. It will be further understood that the wave form illustrated is illustrative of a structure having a field magnets having 60° angular extent as shown in FIGS. 1 and 3.

The invention has application to any multipole multiphase brushless D.C. motor. Ordinarily there will be one hall effect switch for each phase. The angular spacing of the hall effect switches may vary and the logic circuit which cooperates with the output of the hall effect switches will vary with the physical positioning of the hall effect switches. In the embodiment illustrated in FIGS. 1, 2 and 3 the hall effect switches are spaced apart 30 mechanical degrees.

As indicated previously, the angular extent of the field magnet in the embodiment which has been illustrated is at least 60° and may be as great as 90°. In a two pole motor, there will be two field magnets required which will have an angular extent of between 120° and 180°.

Although it is not as desirable, it will be understood that apparatus could be constructed without departing from the spirit of the invention with the commutating and field magnets disposed on the stator. Another possible construction has the rotor within the stator.

At the time of this application, latching hall effect switches are not available. Accordingly, it is essential that the commutating magnets 20, 22, 24 and 26 extend in end abutting relationships to provide positive control over the hall effect switches. It will be understood, of course, that if there was any space between successive commutating magnets such as 20 and 22, that the state of the hall effect switch disposed intermediate the commutating magnets would be indeterminate. It is anticipated that latching hall effect switches will eventually be available. When such apparatus is available, it may be possible to provide commutating magnets which do not extend in end abutting relationship. It is possible, however, that for reasons of economy it will be desirable to still have the commutating magnets extended in end abutting relationship since it is anticipated that the latching hall effect switches will be more expensive than the presently available non-latching hall effect switches.

Having thus described our invention, we claim:

1. A multipole multiphase brushless direct current motor having a rotor which includes a plurality of angularly spaced field magnets and a stator having phase windings and a circuit for switching electric power to said phase windings which comprises a plurality of hall effect switches and a plurality of angularly spaced commutating magnets carried on said rotor.

2. The apparatus as described in claim 1 wherein each of said commutating magnets is axially adjacent to one of said field magnets.

3. The apparatus as described in claim 2 wherein said field magnets and said commutating magnets are both radially polarized.

4. The apparatus as described in claim 3 wherein the direction of radial polarization of said field and commutating magnets is opposite.

5. The apparatus as described in claim 4 wherein said hall effect switches are carried on said stator.

6. The apparatus as described in claim 5 wherein said apparatus includes one hall effect switch for each phase of said motor.

7. The apparatus as described in claim 6 further including a printed circuit board which is part of said stator and wherein said hall effect switches are carried on said printed circuit board.

* * * * *